INVENTOR.
PAUL E. PARNELL
BY
ATTORNEYS

__United States Patent Office__

3,343,810
Patented Sept. 26, 1967

3,343,810
DYNAMIC LOAD COMPENSATION SYSTEM
Paul E. Parnell, 3215 Boundary St.,
San Diego, Calif. 92104
Filed May 25, 1966, Ser. No. 552,856
6 Claims. (Cl. 254—172)

ABSTRACT OF THE DISCLOSURE

This disclosure is concerned with a system for automatically maintaining a substantially constant tension on a cable which supports a dynamically changing load. The disclosure describes a system including two sets of sheaves, one of which is stationary and other being movable. The cable is guided through the sheaves to support a load such as scientific instrumentation which may be lowered over the side of a ship, for example. The movable set of sheaves as described in the disclosure is positioned by actuation of a main cylinder controlled by a valve system responsive to a load which senses changes in the cable load and causes additional cable to be paid out or reeled in accordance with the instantaneous load. Additionally, the disclosure describes how the static load is automatically compensated for independently of the sensed dynamic load and the remainder of the arrangement for compensating for changes in such dynamic load.

Background of the invention

The invention described herein may be manufactured and used by or for the Government of the United States of America for governmental purposes without the payment of any royalties thereon or therefor.

This invention is concerned with a system for compensating for the load on a cable and more particularly is especially adapted to automatically compensate for dynamic changes in such a load. The total load will include not only the dead weight of the cable and the dead weight of the load which it supports, but also the dynamic load which may change instantaneously due to relative movement between the cable support and the load, drag, catenary effects, etc. as when a cable is employed to tow instrumentation or other types of loads at sea, for example.

A wide variety of changes in load may be experienced when towing a load at sea due to motion of the vessel, motion of the sea, such as ground swells and waves, the variation of buoyancy due to change in the amount of submerged cable resulting from movement of the towed object with respect to movement of the sea, as well as changes in the dead weight of the towing cable and the load which is being towed due to varying amounts of cable being paid out or drawn into the towing vessel.

In the prior art, a number of systems have been employed in attempts to instantaneously compensate for dynamic changes in the load on a cable. Many of such prior art systems employed a changeable speed motor as its principal implementation of compensation for changes in load. The cost of such a variable speed motor is comparatively quite high and also entails considerable electrical control equipment of a extremely heavy duty nature to affect automatic compensation for dynamic changes of the load carried by a cable being paid out or drawn in by such motor.

Other prior art systems have been a compromise in the sense that they do not afford automatic compensation for dynamic changes in a broad variety of loads, but merely afford some compensation for a maximum amount of tension on a cable being controlled, for instance.

Accordingly, a prime object of the present invention is to provide a system for automatically compensating for dynamic changes in the load on a cable over a broad range of such loads and having highly responsive, virtually instantaneous operative characteristics.

A further object of the present invention is to provide such a system for automatically compensating for the dynamic changes in the load on a cable which can employ a constant speed motor drive means for paying out and drawing in the cable thus eliminating the need for a relatively very expensive variable speed control motor drive means.

Yet another object of the present invention is to provide such a system wherein the instantaneous load is sensed by a sensing means together with an arrangement of a first and second plurality of sheaves with multiple working cables disposed therebetween wherein a changing force is developed to change the disposition of said two plurality of sheaves which force is a function of the sensed load and the number of working cables disposed between the two plurality of sheaves.

A still further object of the present invention is to provide a system for automatically compensating for changes in the dynamic load on a cable wherein a substantially constant speed cable drive means is arranged to operate independently of said automatic compensation.

Summary of the invention

In its preferred and fundamental form the present invention comprises a system for automatically compensating for dynamic changes in the load of a cable which includes a sensing means for producing a load signal as a function of the instantaneous load on the cable and including both the dead weight load of the cable and the dead weight which it carries and the dynamic load due to changes such as have been described hereinbefore in the instance where a cable is towed at sea, for example. A first and second plurality of sheaves are spaced from each other having the cable disposed in an arrangement of multiple working cables therebetween. Means are provided for supporting the first plurality of sheaves in a substantially stationary relationship with respect to the second plurality of sheaves. A compensation means is provided which is responsive to the load signal produced by the sensing means for changing the disposition of the second plurality of sheaves in a first direction to compensate for any increase in the sensed cable load and to change the disposition of the second plurality of sheaves in a second direction to compensate for a decrease in the sensed cable load. The compensation means is adapted to produce a changing force as a function of the sensed load signal and the number of working cables disposed between the first and second plurality of sheaves. Thus, an instantaneous and automatically responsive system is provided to compensate for dynamic changes in the load on the cable.

These and other advantages, features and objects of the present invention will be understood more fully from the following description of several embodiments taken together with the drawings and the scope of the invention will be pointed out more particularly in the appended claims.

Figure 1:
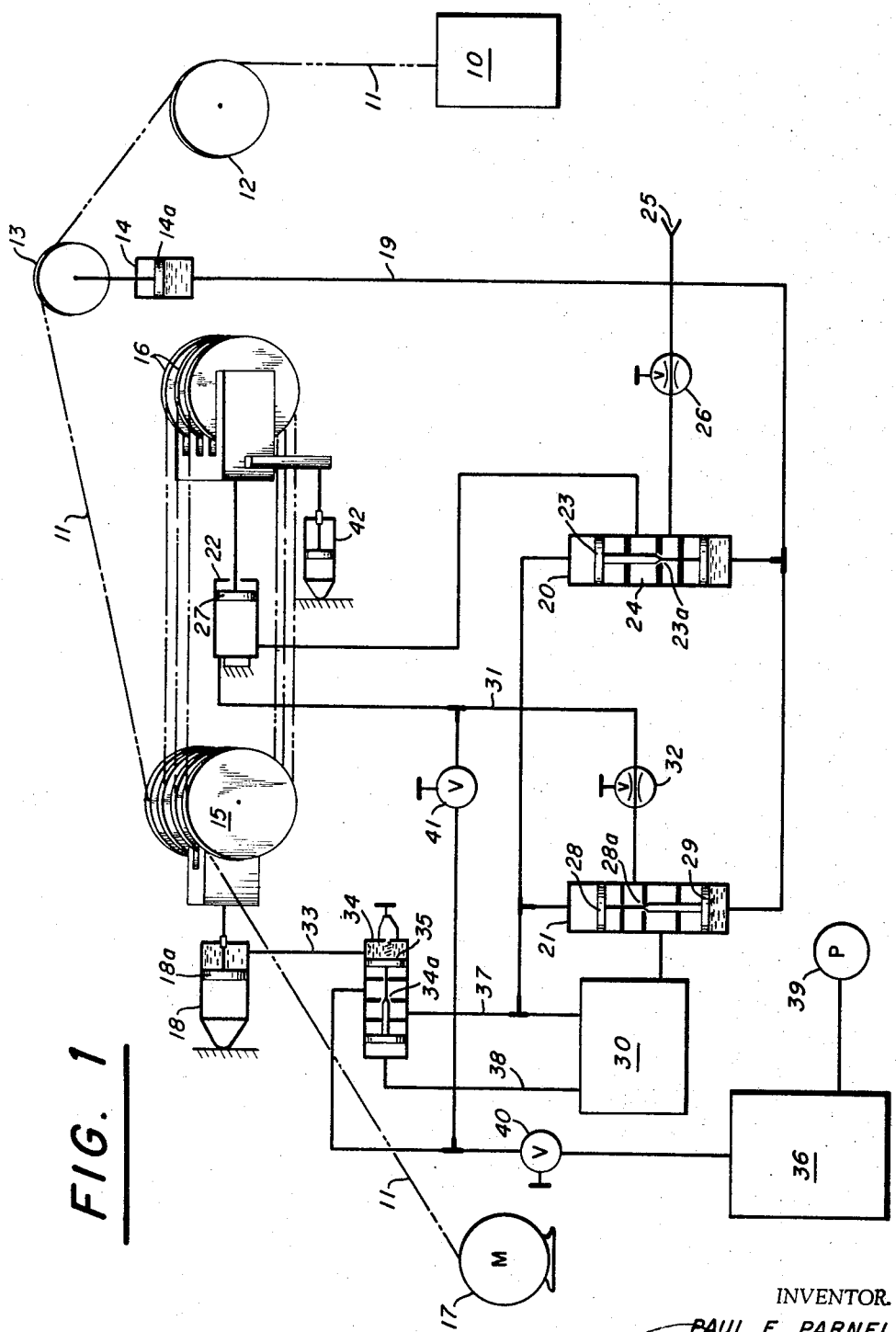
FIG. 1 is a schematic illustration of one form of the present invention.

In FIG. 1 a load 10 is shown as depending from a cable 11. The cable 11 is supported through a head sheave 12 to a feedback sheave 13 which is connected to a valve feedback load cell 14 that will be described in more detail hereinafter. The cable 11 is fed to a plurality of sheaves 15 and a second plurality of sheaves 16 to a motor drive means 17.

An air pressure and hydraulic control arrangement is provided to operate the cable and its load in a manner as follows: the first plurality of sheaves 15 are arranged to be supported in a substantially stationary manner and a regulator feedback load cell 18 is arranged to sense the dead load on the cable and produce a signal as a function of the dead load. A valve feedback load cell 14 is connected to the feedback sheave 13 so as to produce a signal as a function of the instantaneous load on the cable including dynamic changes in such load. This signal is connected by a hydraulic line 19 to a discharge valve 20 and an inlet valve 21.

In the particular embodiment of FIG. 1 the invention is implemented in a partially hydraulic and partially air pressure system. The signal developed by the valve feedback load cell 14 is hydraulic and is connected by a hydraulic line to the hydraulic portions, respectively, of discharge valve 20 and inlet valve 21. Both the discharge valve 20 and the inlet valve 21 have upper portions which are operated by air pressure and the air pressure portions of the discharge valve 20 and the inlet valve 21 are, in turn, connected to air pressure operated main cylinder 22. The main cylinder 22 has a piston 27 which is arranged and disposed so as to position the movable second plurality of sheaves 16 thereby displacing the second plurality of sheaves 16 with respect to the first plurality of sheaves 15 and taking up the plurality of working cables disposed therebetween.

The discharge valve 20 which has a movable piston arrangement 23 is normally positioned so that the valve seat portion 23a is closed. Thus, the air pressure in the cylinder space 24 is not allowed to pass to the air pressure exhaust 25. However, upon a sudden increase in load sensed by the feedback load cell 14, an increase in hydraulic pressure is impressed upon the lower hydraulic portion of the discharge valve 20 so as to displace the movable piston 23 upwardly opening the valve seat 23a and allowing the air pressure to escape from the volume 24 within the cylinder. This volume of the cylinder is connected in turn to the air pressure in the main cylinder 22. Thus, the air pressure in the main cylinder 22 is relieved by connection through the cylinder portion 24 which is exhausted at a rate controlled by a variable orifice 26. As a consequence, the piston 27 of the main cylinder 22 is displaced so as to move the movable plurality of sheaves 16 in a direction closer to the stationary plurality of sheaves 15 paying out cable as the load suddenly increases.

By contrast, if the load suddenly decreases, the movable piston arrangement 28 of the inlet valve 21 is displaced downwardly in response to a drop in hydraulic pressure exerted against the lower portion of the piston 29 thus opening the valve seat 28a and allowing compressed air from an air reservoir of working pressure 30 to pass into and through the cylinder 21, valve seat 28a and through a connecting air pressure line 31 at a rate controlled by a variable orifice 32. The air pressure line 31 is connected to the main cylinder 22 and increased air pressure displaces the piston 27 so as to move the movable plurality of sheaves 16 away from the stationary plurality of sheaves 15 taking up the slack or lessened load which was detected by a decrease in the hydraulic pressure generated through the valve feedback load cell 14.

The regulator feedback load cell serves the function of detecting any change in the dead weight load on the cable 11 and produces a signal which is a function of such dead weight load. Such signal, which may be in the form of a hydraulic pressure, is connected through appropriate means such as a hydraulic pressure line 33 to a hydraulically operated, air pressure regulator 34. Upon an increase in hydraulic pressure impressed upon the movable piston 35 of the regulator 34, the piston is displaced unseating the valve seat 34a which in effect connects a high pressure air reservoir 36 through the air pressure portion of the regulator 34 to the air reservoir 30 maintaining an appropriate working pressure in accordance with the concept of the present system. Increased or higher pressure compressed air is admitted to the air reservoir 30 from the high pressure air reservoir 36, through connection 37, until the air pressure is equalized by reason of the feedback provided through the connection 38 from the working pressure air reservoir 30 to opposite sides of the piston 35 of the regulator 34. Sufficient increased air pressure is admitted to the air reservoir 30 so as to equalize against the hydraulic pressure developed at the opposite end of the piston 35 of the regulator feedback load cell 34. Accordingly, as increased dead weight load is detected by the regulator feedback load cell 18, the air pressure in the working air pressure air reservoir 30 is increased. Conversely, as a decrease in load is sensed by the regulator feedback load cell 18, the air reservoir working pressure is decreased.

It will be noted by those skilled in the art that the arrangement as exemplified by the embodiment of FIG. 1 in accordance with the concept of the present invention, is operative to automatically compensate for dynamic changes in the load on the cable 11 by a sensing means and the two pluralities of sheaves one of which is movable with respect to the other and operated by a compensation means which is responsive to the load signal sensed at the valve feedback load cell sensing means 14. Additionally, the compensation means is responsive to automatically compensate, instantaneously upon detection of a change in a dynamic load, without any change in the operation of the driving motor 17 which is employed to take up or pay out on the cable 11 as desired.

Furthermore, it will be noted that there are six working cables between the multiple arrangements of sheaves 15 and 16. Accordingly, as conceived by the present invention, the air pressure within the main cylinder 22, multiplied by the area of the piston 27, equals six times the tension produced by the cable 11 plus the amount of frictional force developed by reason of the working parts such as the movable piston 27; the valve feedback load cell 14 which is the sensing means responding to the instantaneous tension on the cable, develops a hydraulic pressure, which when multiplied by the area of the piston 14a within the cell 14, equals the instantaneous tension on the cable 11. In accordance with the concept of the present invention, the hydraulic pressure developed within the regulator feedback load cell 18, multiplied by the area of the movable piston 18a, is equal to twice the tension of the cable 11.

A pump 39 is arranged to maintain a high air pressure within the air reservoir 36 in a conventional manner. Manual shut-off valves 40 and 41 are provided to facilitate shutting down the pressure lines from the high pressure air reservoir 36 as may be desired. A snubber 42 is provided to develop a small load at mid-stroke of piston 27 so that when no dynamic load is present the piston 27 will move to mid-stroke position until a dynamic load is developed at which time the piston 27 is free to move in either direction.

Figure 2:
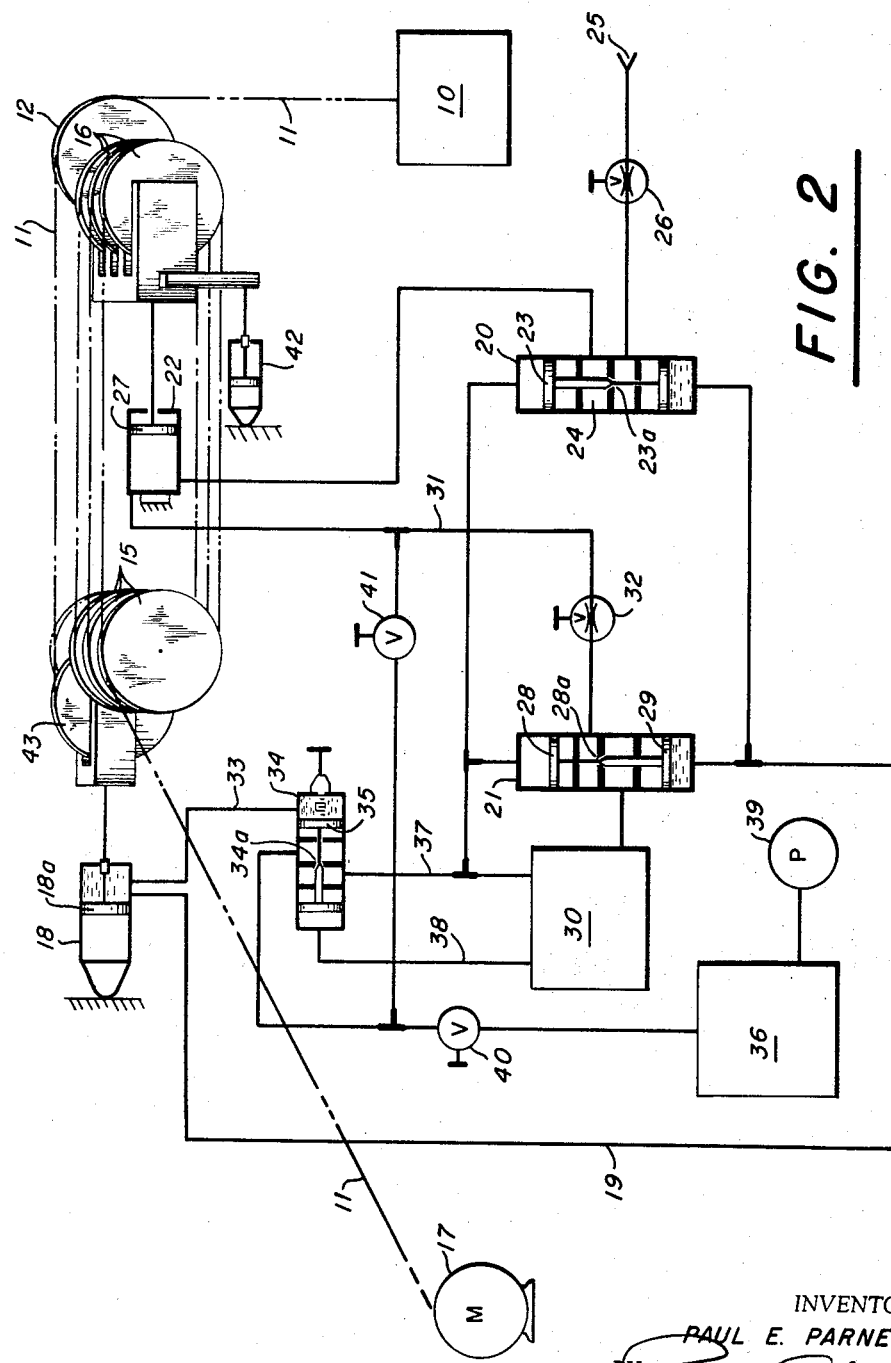
FIG. 2 is a schematic representation of a varient form of the present invention.

FIG. 2 shows a variant embodiment of the present invention in which the feedback load cell is employed to adjust both the working pressure air reservoir in accordance with the dead weight load on the cable, and also to detect the instantaneous dynamic changes in load so as to provide an appropriate load signal to automatically compensate for such dynamic changes in load. In FIG. 2 comparable elements bear the same numerical designation as in FIG. 1.

The principal difference between the embodiment of FIG. 1 and that of FIG. 2 is that in FIG. 2 the feedback load cell 18 is connected so as to provide a hydraulic signal as a function of instantaneous dynamic changes in loads which are sensed through a sheave 43 that is arranged to be movable with respect to the plurality of stationary sheaves 15, and also with respect to the stationary head sheave 12 so as to give a signal proportional to any dynamic change in the load 10 and the tension which the load 10 places on the cable 11. Accordingly, in the arrangement of FIG. 2, the feedback sheave is effectively eliminated and the valve feedback load cell 14 of FIG. 1 is eliminated in that the hydraulic cell 18 provides an appropriate hydraulic signal which is transmitted through a hydraulic line 19 to both the discharge valve 20 and the inlet valve 21. However, the basic operation of the embodiment of FIG. 2 is substantially the same in concept and spirit as that of FIG. 1.

A change in hydraulic pressure, for instance, detected by an increase in pressure developed in the feedback load cell 18 will cause the valve 23a of the piston 23 to be displaced, allowing air pressure to be exhausted from the cylinder portion 24 of the discharge valve 20 through the exhaust 25 at a rate regulated by the variable orifice 26. This, in turn, relieves the air pressure in the main cylinder 22 by reason of the pressure line connection thereto from the discharge valve 20. A consequent decrease in air pressure within the main cylinder 22 allows the plurality of movable sheaves 16 to move toward the stationary plurality of sheaves 15, relieving tension on the working cables disposed therebetween and the cable 11 so as to automatically and instantaneously compensate for an increased change in load.

Conversely, when a decrease in load is experienced, the inlet valve 20 operates so as to displace the piston 28 unseating the valve 28a, allowing an increased amount of air pressure to be fed to the main cylinder by reason of the air pressure connection through 31 and at a rate regulated by the variable orifice 32. This action displaces the piston 27 of the main cylinder 22 so as to increase the disposition of the plurality of movable sheaves 16 with respect to the plurality of stationary sheaves 15, thereby taking up upon and compensating for the decrease in tension sensed on the cable 11. The remainder of the system, including the operation of the pump 39, the high pressure air reservoir 36, and the regulator 35, operates substantially the same as previously described in connection with the embodiment of FIG. 1.

It will be appreciated by those skilled in the art that while the embodiments schematically represented by the illustrations of FIGS. 1 and 2 include an air pressure and hydraulically operated system, the concept and spirit of the present invention is such that may be embodied in either a wholly air pressure system or a wholly hydraulic system as desired.

A most important aspect and advantage of the concept of the present invention is the fact that the compensation system is independent of the cable drive means. That is to say, that increases or decreases in load on the cable, whether they be dead weight load or dynamic load, will be automatically compensated for independently of the operation of the drive motor means which takes up or pays out the cable as may be desired.

Moreover, the present invention is so conceived as to obviate the requirement for a variable speed motor drive means which was inherent in many prior art systems. A constant speed motor drive means is usually much less expensive and less complicated than variable drive means wherein the compensation for changes in load are incorporated in the motor drive means.

Obviously many modifications and variations of the present invention are possible in the light of the above teachings. It is therefore to be understood that within the scope of the appended claims the invention may be practiced otherwise than as specifically described.

What is claimed is:
1. A system for automatically compensating for dynamic change in the load cable comprising:
   a first and second plurality of sheaves spaced from each other and having said cable disposed in an arrangement of multiple working cables therebetween;
   means supporting said first plurality of sheaves in substantially stationary relationship in respect to said plurality of sheaves;
   a sensing means positioned relative to said load and said plurality of sheaves for producing a load signal as a function of the instantaneous load on said cable; and,
   compensation means responsive to said load signal for changing the disposition of said second plurality of sheaves in a first direction to compensate for an increase in the sensed cable load and in a second direction to compensate for a decrease in the sensed cable load,
   said means being adapted to produce a changing force as a function of a sensed load signal and the number of working cables disposed between said first and second plurality of sheaves.

2. A system for automatically compensating for the dynamic change in a load on a cable as claimed in claim 1 and including a means for automatically compensating for changes in the dead load of said cable independently of the compensating changes effected responsive to the instantaneous dynamic load on said cable.

3. A system for automatically compensating for dynamic changes in the load on a cable as claimed in claim 2 and including reversible drive means for controllably feeding said cable to and from said sheaves.

4. A system for automatically compensating for dynamic changes and dead load changes on a cable as claimed in claim 3 wherein said drive means is a substantially constant speed device controlled independently of said compensation means.

5. A system for automatically compensating for dynamic and dead load changes in the load on a cable as claimed in claim 4 wherein said sensing means is operative to produce a pressure signal representative of said load and wherein said compensation means is a pressure operated means.

6. A system for automatically compensating for dynamic and dead load changes in the load on a cable as claimed in claim 5 wherein said compensation means has a pressure-responsive area substantially equal to the pressure signal area of the sensing means multiplied by the number of working cables disposed between said first and second plurality of sheaves.

References Cited

UNITED STATES PATENTS

| 2,303,847 | 12/1942 | Lamond | 254—172 |
| 2,443,028 | 6/1948 | Edwards | 254—172 |
| 3,150,860 | 9/1964 | Nelson | 254—172 |

FOREIGN PATENTS 280,781   7/1962   Netherlands.

EVON C. BLUNK, Primary Examiner.

H. C. HORNSBY, Assistant Examiner.